Patented July 30, 1929.

1,722,323

UNITED STATES PATENT OFFICE.

LEO P. CURTIN, OF FREEHOLD, NEW JERSEY, ASSIGNOR TO THE WESTERN UNION TELEGRAPH COMPANY, OF NEW YORK, N. Y., A CORPORATION OF NEW YORK.

WOOD PRESERVATIVE.

No Drawing.   Application filed June 24, 1927.   Serial No. 201,279.

This invention relates to the preservation of wood, such as telegraph and telephone poles, railway ties, structural timbers and the like; and comprises a novel wood preservative prepared by the regulated chlorination of certain hydrocarbon derivatives, more especially hydroxy derivatives of aromatic hydrocarbons such as xylene.

It is well known that the coal tar hydrocarbons, or mixtures thereof with such derivatives as the coal tar acids and bases, are useful wood preservatives, and certain mixtures of this kind are widely used for that purpose. Such mixtures include so-called creosote oil or dead oil, which is primarily that fraction which distills over between 240° and 270° C. The creosote oil of commerce consists of this fraction plus all undesired liquid residues from the manufacture of carbolic acid, naphthalene and anthracene, and accordingly while consisting predominantly of the above fraction contains considerable proportions boiling below 240° and above 270°. These mixtures include also anthracene oil, which may be regarded as that fraction which distills over between 270° and 400° C. The wood preservatives known as carbolineums are taken from this fraction.

In the preservation of wood, important considerations are the toxicity of the preservative, and its permanence under exposure to atmospheric conditions. The toxicity is conveniently expressed as the "killing point",—the minimum per cent of preservative which will inhibit the development of a specific wood-destroying fungus such as Fomes Annosus, Lenzites Sepiaria, etc. The permanence is related to the vapor tension under atmospheric conditions, and is roughly indicated by the boiling point, although losses due to leaching and oxidation also enter to a material extent. Investigations of the coal-tar fractions from the above points of view have shown that while the permanence increases with rising boiling point, as would be expected, the toxicity varies in the inverse manner, so that none of these fractions combine the desiderata of long time permanence and high toxicity. The tar acids are of relatively high toxicity but of low permanence, being subject to loss by vaporization, leaching and oxidation.

I have found that the effect of a controlled addition of chlorin to these tar acids, and to similar materials derived from other sources such as wood tars, is greatly to increase their permanence and toxicity. Tar acids containing about 40% of combined chlorin have shown a killing point with Fomes annosus of somewhat less than .004%, that is to say, more than ten times the toxicity of cresylic acid, and more than one hundred times the toxicity of ordinary creosote. Their permanence is also favorably affected, the chlorinated products being less soluble, much less volatile and far more resistant to oxidation.

In the case of such mixtures the chlorin enters into combination largely by a reaction of substitution, with elimination of hydrochloric acid; but to a lesser extent by an addition reaction, as indicated by the fact that the increase in weight by chlorination is materially greater than can be accounted for by a substitution reaction. Hydrochloric acid is evolved and recovered, and any residual acid may be blown out by air, and if necessary neutralized by lime, metal oxids, or the like. Tar-acids, and especially the xylenols, react very readily with chlorin. I prefer to continue the chlorination of such phenolic bodies as the above until the increment of weight is not less than about 15% which is rather less than corresponds to the formation of mono-derivatives; and not more than about 50%, which corresponds approximately to the formation of tri-chloro-derivatives.

It might be expected from theoretical considerations that chlorination products derived from the heavier hydrocarbons would exhibit the highest toxicity. Tests have shown however that this is not the case, at least as a general rule. For example, the chlor-naphthalenes, both mono and di-chlor derivatives, have proven inferior to naphthalene with respect to toxicity. The reason for this appears to be that a certain measure of solubility in water is essential to toxicity, and that these higher molecular weight bodies are deficient in solubility and hence relatively non-toxic. I am aware that it has been proposed to introduce very small proportions of chlorin, amounting to a fraction of one per cent, into anthracene oils or fractions thereof, for the purpose of removing their characteristic odor. Such practice is not in accordance with my invention since it does not accomplish either of its primary objects, to wit, a material increase in toxicity and permanence.

The high toxicities of my chlorinated tar acids present the advantage that these may be mixed with many times their volume of any inexpensive but permanent and penetrative diluent, such as a heavy petroleum oil. Even when admixed with 25 volumes or more of such a neutral diluent, the mixture is sufficiently toxic for the purpose of this invention. The diluent may be toxic or non-toxic, but should preferably be penetrative, quite permanent and of low volatility, and should have water-proofing qualities. A typical composition of this type comprises 20 to 30 parts of heavy petroleum oil, carrying in solution about one part of a chlorinated tar acid. In other embodiments of the invention the toxic material may consist exclusively of chlorinated tar-acids, or mixtures of this material in any proportion with coal tar creosote, anthracene oil, water gas tar, wood tar or other similar bituminous liquid. Not only are the chlorinated tar acids highly penetrative with respect to wood, but they possess the property of greatly increasing the penetrative properties of petroleums when admixed therewith, and they likewise improve the penetration of creosote and of bitumens generally.

The expression "chlorin derivatives of coal-tar acids" and expressions of similar import used in the claims are to be understood as covering these several chlorinated bodies, irrespective of whether they are actually derived from coal tar or from other commercial sources. Thus for example the so-called tar-acids are phenolic bodies which may be produced synthetically and which occur also in wood-tar distillates and in other commercial liquids; and it is within the scope of my invention to chlorinate such bodies irrespective of source, and to employ their chlorin derivatives in compounding my novel wood preservatives.

My preferred composition to be subjected to chlorination consists mainly of xylenols. The chlorin derivatives of the tar acids of lower molecular weight (phenol and the cresols) are less permanent, and somewhat less toxic toward fungi. A crude xlyenol (the coal-tar fraction boiling between 207° and 230° C.) when chlorinated to 35% chlorin content, shows a killing point toward Fomes annosus of 38 parts per million (.0038%), concentrations of this strength or greater completely inhibiting the growth of this wood-destroying fungus. This is about ten times as toxic as the unchlorinated xylenol and more than one hundred times as toxic as commercial creosote.

My researches have shown that with the tar acids of higher molecular weight than the xylenols, no material increase in toxicity is obtained by chlorination. For example, the toxicity of beta-naphthol is not increased by chlorination. In the case of such compounds of high molecular weight the theoretical increase in toxicity obtainable by chlorination is apparently largely or completely offset by a decrease in solubility of the chlorinated substance. Optimum results are obtained with the fractions rich in xylenols.

While I prefer to dissolve the chlorinated tar acids in an organic diluent as above described, it is within the scope of my invention to employ these chlorinated tar acids, or their salts, in aqueous solution, such for example as a solution containing two to five parts by weight of the chlorinated body.

I claim:

1. A wood preservative comprising chlorin derivatives of coal-tar acids of higher molecular weight than the cresols, and characterized by high toxicity and permanence relative to creosote oil.

2. A wood preservative comprising chlorin derivatives of coal-tar components including chlorinated tar-acids of higher molecular weight than the cresols, and an organic diluent therefor, said preservative characterized by high toxicity and permanence relative to creosote oil.

3. A wood preservative comprising chlorin derivatives of coal-tar components including chlorinated tar-acids of higher molecular weight than the cresols, and a substantially non-volatile, penetrative organic diluent therefor, said preservative characterized by high toxicity and permanence relative to creosite oil.

4. An article of wood, impregnated with a preservative comprising chlorin derivatives of coal-tar acids of higher molecular weight than the cresols.

In testimony whereof, I affix my signature.

LEO P. CURTIN.